July 16, 1963 F. J. KAMPMEIER 3,097,568
MACHINE TOOL

Filed Oct. 9, 1961 4 Sheets-Sheet 1

INVENTOR
Frederick J. Kampmeier
by Wolfe, Hubbard, Voit & Osann
ATTORNEYS

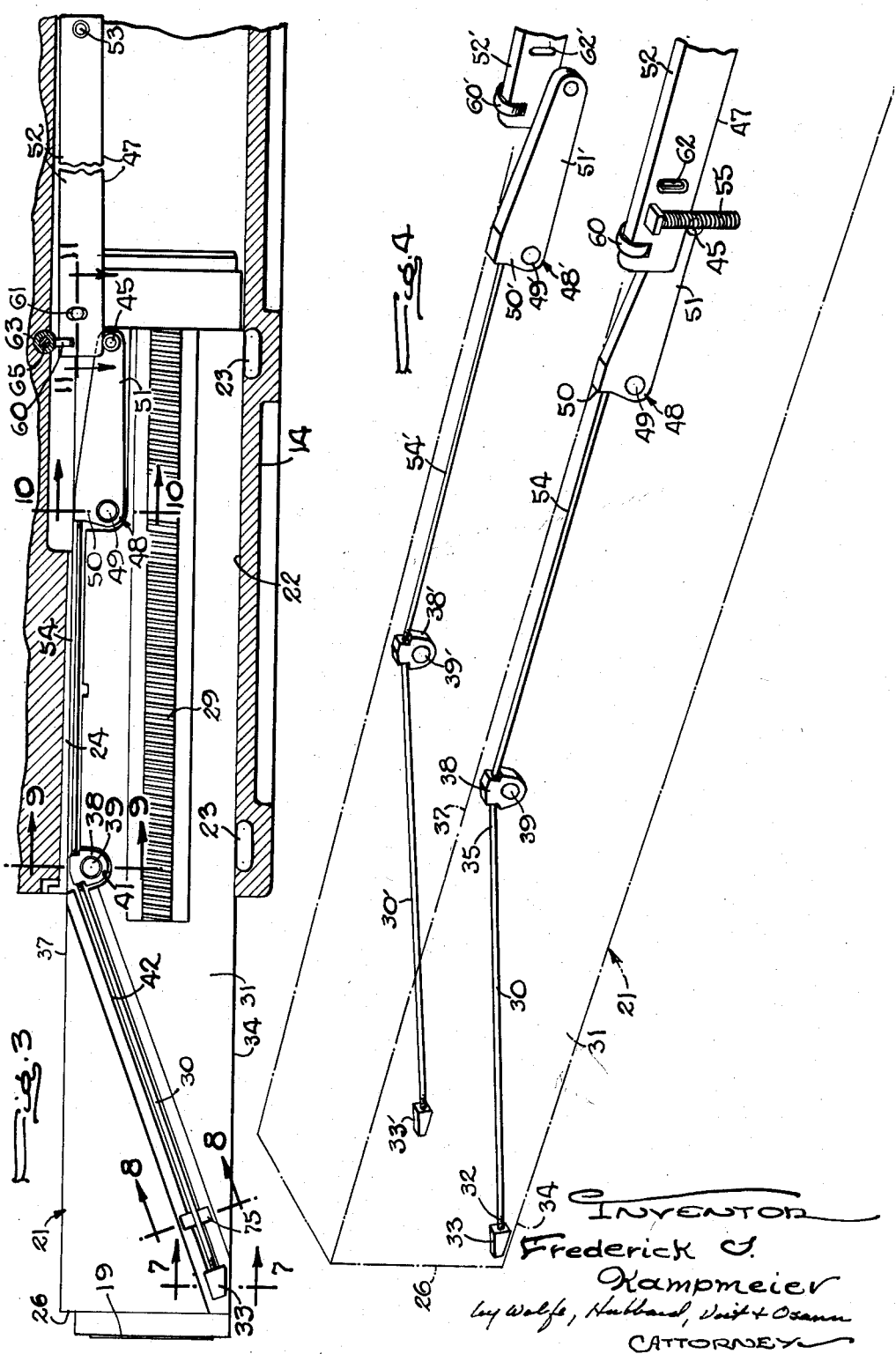

July 16, 1963

F. J. KAMPMEIER 3,097,568

MACHINE TOOL

Filed Oct. 9, 1961

INVENTOR
Frederick J. Kampmeier
by Wolfe, Hubbard, Voit & Osann
ATTORNEY

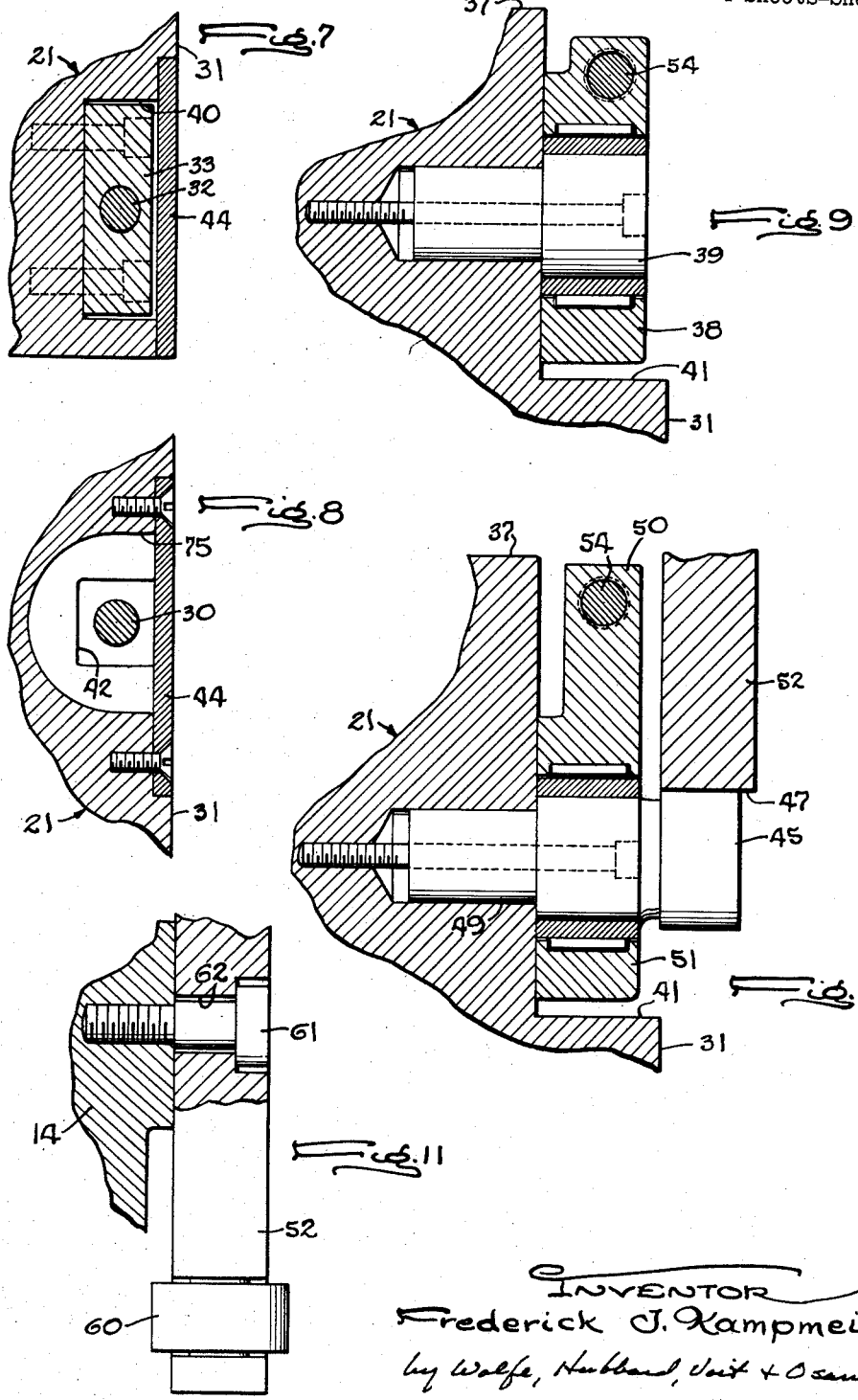

United States Patent Office 3,097,568
Patented July 16, 1963

3,097,568
MACHINE TOOL
Frederick J. Kampmeier, Rockford, Ill., assignor to The Ingersoll Milling Machine Company, Rockford, Ill., a corporation of Illinois
Filed Oct. 9, 1961, Ser. No. 143,627
10 Claims. (Cl. 90—11)

This invention relates to machine tools of the type in which an elongated ram is supported cantilever fashion in a head for sliding back and forth to carry a metal removing tool different distances outwardly from the head and into cutting engagement with a work surface remote from the head.

The general object of the invention is to eliminate downward deflection of the outer end of the ram in the extended positions of the latter thereby maintaining the accuracy of the machine when the work is disposed a substantial distance from the head.

The primary object is to utilize a novel brace element connected to the outer end portion of the ram and tensioned in proportion to the amount of extension of the ram to apply a lifting force thereto and counteract the tendency of the outer end to sag.

A more detailed object is to dispose the brace diagonally of the ram and to employ a novel mechanism which automatically increases and decreases the tension in the brace as an incident to the projection and retraction of the ram.

The invention also resides in the mechanism for tensioning the brace as the ram is extended.

Other objects and advantages of the invention will become apparent from the following detailed description taken in connection with the accompanying drawings, in which FIGURE 1 is a fragmentary side elevational view of a machine tool embodying the novel features of the present invention.

FIG. 3 is a fragmentary sectional view taken substantially along the line 3—3 in FIG. 2 and shown on a slightly reduced scale.

FIG. 4 is a perspective schematic view of the brace structure with the ram shown in phantom.

FIG. 7 is an enlarged fragmentary section taken along the line 7—7 in FIG. 3.

FIG. 8 is an enlarged fragmentary sectional view taken along the line 8—8 in FIG. 3.

FIG. 9 is an enlarged fragmentary sectional view taken along the line 9—9 in FIG. 3.

FIG. 10 is an enlarged fragmentary sectional view taken along the line 10—10 in FIG. 3.

FIG. 11 is an enlarged fragmentary sectional view taken along the line 11—11 in FIG. 3.

Figure 1:
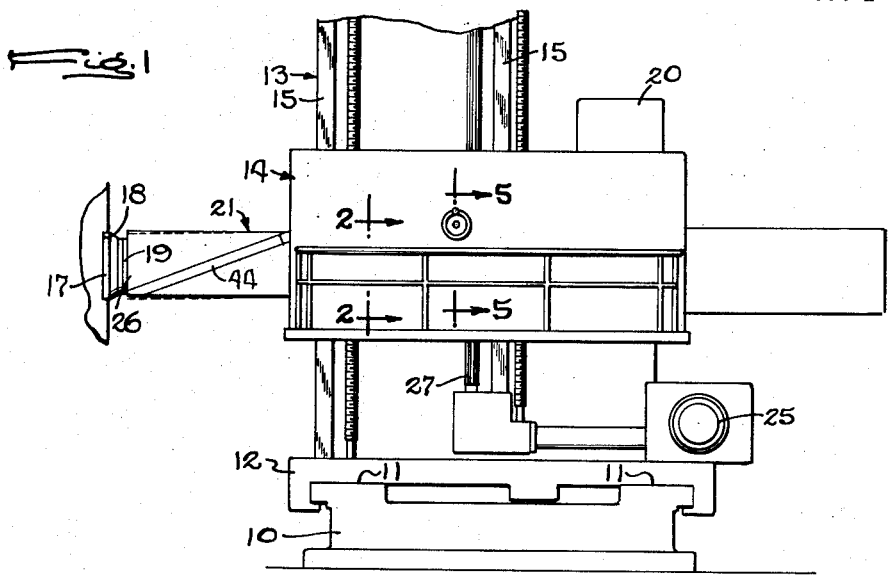

For purposes of illustration, the invention is shown in the drawings incorporated in a so-called openside horizontal milling machine including a bed 10 having horizontal ways 11 slidably supporting a saddle 12 carrying an upright column 13. A head 14 is slidable along spaced vertical ways 15 on the column and carries a power-driven cutter 17 which thus may be positioned along the perpendicular paths defined by the ways to operate on a work surface 18 disposed alongside the machine. Suitable reversible power actuators (not shown) are provided for moving the column back and forth along these paths.

The cutter 17 is keyed in the usual manner to the outer end of a rotary spindle 19 driven by an electric motor 20 and journaled in a rectangular ram-type quill 21 supported cantilever fashion on the head and slidable endwise back and forth in the head to carry the cutter into cutting engagement with the work surface when the latter is positioned at a point remote from the machine bed. In this instance, the ram 21 is guided in a horizontal slideway 22 in the head formed by spaced sets of anti-friction bearings 23 disposed beside and below the ram and tapered gibs 24 bearing against the top of the ram and adjustable inwardly along the slideway to take up any wear occurring in service use.

Figure 2:
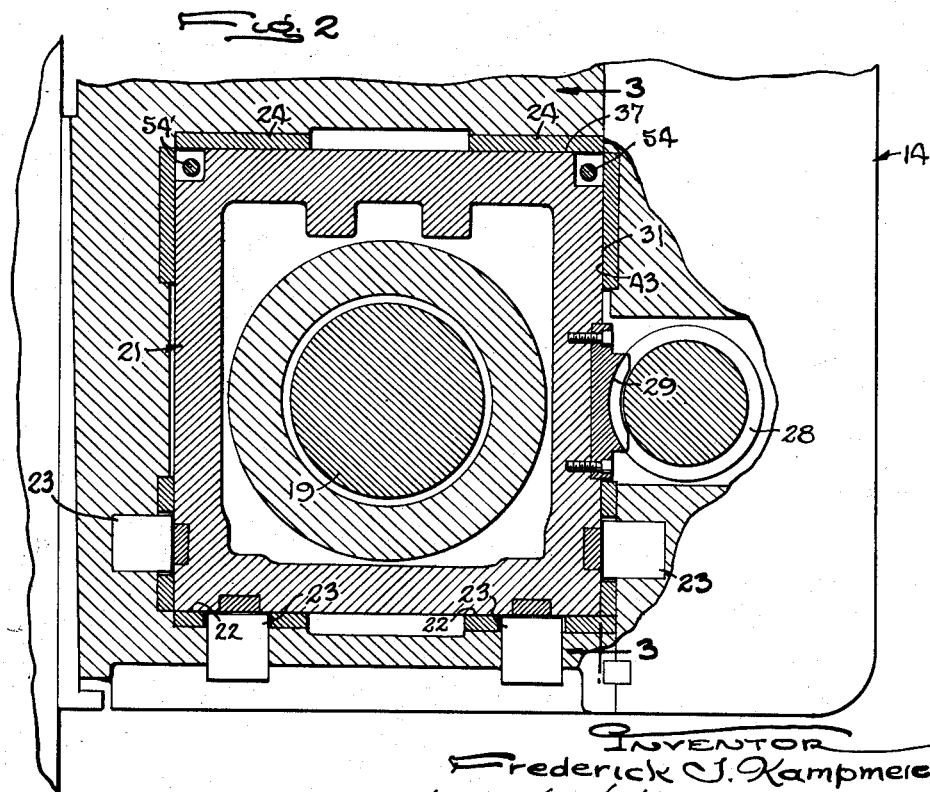
FIG. 2 is an enlarged fragmentary sectional view taken along the line 2—2 in FIG. 1.

Back and forth sliding of the ram is effected by power derived from a suitable actuator such as a reversible electric motor 25 mounted on the saddle 12 and coupled through appropriate reduction gearing to a splined vertical shaft 27. The latter turns a worm 28 (FIGS. 2 and 5) which is disposed alongside the ram and meshes with the teeth of a horizontal rack 29 bolted to the ram. Thus, as the motor is energized in opposite directions, the ram is fed back and forth between a retracted position in which the cutter is close to the head and an extended position in which one end portion of the ram projects laterally outwardly to carry the cutter a substantial distance to one side of the machine.

As the ram slides outwardly toward the extended position shown in FIGS. 1 and 3, the outer end carrying the cutter tends to deflect downwardly in a vertical plane under the weight of the projecting end portion of the ram as indicated in phantom in FIG. 1. As a result, it becomes increasingly difficult to maintain close work tolerances as the projecting length of the ram increases.

The present invention contemplates eliminating such downward deflection even when the ram 21 is fully extended thereby to maintain the accuracy of the machine when operating on work surfaces disposed a substantial distance from the machine. To this end, a supporting force having a vertical component sufficient to overcome this deflection is applied to the ram at a point spaced outwardly from the head 14 to urge the projecting end of the ram upwardly and, consequently, to counteract the deflection which otherwise would occur. This force is applied through a brace element 30 secured to the ram, preferably near the outer end 26 of the latter, and extending upwardly and toward the head therefrom. Means is provided for increasing and decreasing the tension in the brace automatically as an incident to the projection and retraction of the ram and preferably varying the tension in proportion to the amount of sliding of the ram.

Herein, the brace 30 comprises an elongated rod positioned along one side 31 of the ram to extend diagonally upwardly and inwardly from the outer end of the ram. The lower end 32 of the rod is anchored in a block 33 bolted to the ram adjacent the lower edge 34 and outer end 26 of the side 31, while means is provided for movably supporting the upper end 35 of the rod adjacent the upper edge 37 of the side 31 intermediate the ends of the ram. In this instance, this means comprises a generally upright rocker arm 38 fulcrumed at its lower end on the side of the ram to swing about a horizontal axis defined by a pin 39 projecting laterally from the ram. The pin 39 is spaced below the edge 37 a distance slightly greater than the length of the rocker arm so that the upper end of the rod, which is preferably fastened to the free end of the rocker, is held just below the edge 37.

As shown in FIGS. 3 and 7 through 9, the anchor 33, the brace 30 and the rocker arm 38 may be recessed into out-of-the-way positions in the side of the ram to facilitate mounting the latter for back and forth sliding in the head. The anchor is mounted in a recess 40 (FIG. 7) of rectangular cross-section and of sufficient depth so that the outer surface of the anchor is disposed inwardly from the side 31. The rocker is set into a notch 41 (FIG. 9) adjacent the upper edge 37 and the rod 30 extends along a diagonal groove 42 (FIGS. 3 and 8) of the rectangular cross-section connecting the recess 40 and the notch 41. To provide a flat, unbroken side surface for bearing against the sides 43 of the guideway, a cover plate 44 is bolted over these recesses flush with the side of the ram.

With the brace supported in the manner described above, it may be tensioned to urge the outer end of the ram upwardly simply by swinging the arm 38 in a clockwise direction as viewed in FIGS. 3 and 4. Such tensioning of the brace results in the application at the anchor of a force having a vertical component tending to lift the outer end of the ram. The magnitude of this vertical component depends, of course, upon the angle of inclination of the brace and for this reason it is desirable to position the rocker 38 closely adjacent the upper edge 37 and as close to the outer end 26 as is practicable. So that the lifting force will be applied from a point within the supporting guideway 22, the rocker preferably is spaced inwardly along the ram a distance slightly greater than the maximum intended extension of the ram.

The means for increasing and decreasing the tension in the brace in this instance includes cam and follower elements 45 and 47 responsive to outward movement of the ram and operable to swing the free end of the rocker arm inwardly relative to the ram as the latter moves outwardly. A bell crank 48 spaced inwardly along the ram from the rocker is pivoted on a pin 49 projecting laterally from the side 31 of the ram with one leg 50 of the crank extending upwardly and the other leg 51 extending inwardly along the ram and generally horizontally from the pivot, this horizontal leg preferably being the longer of the two. The follower 45 comprises a roller journaled on the inner end of the horizontal leg 51 to roll along a cam surface 47 comprising an inclined plane preferably formed on the underside of a lever 52. The latter lies alongside the ram and is fulcrumed at its inner end on the head at 53 (FIG. 3) with the plane 47 inclined downwardly toward the outer end of the ram. Thus, as the outward movement of the ram carries the roller 45 along this plane, the roller is pushed progressively downwardly to turn the crank 48 in a clockwise direction as viewed in FIGS. 3 and 4 and correspondingly move the vertical leg 50 away from the rocker 38.

To transmit this motion to the rocker arm, a rod 54 is secured at one end to the inner side of the rocker arm and at the other end to the vertical crank leg 50 at a point adjacent the upper end of the latter. Thus, the rod 54, the crank and the rocker arm constitute a connection for transmitting the follower motion to the brace from a point remote from the upper end of the brace. It will also be apparent that the brace could be connected directly to the crank leg 50 without departing from the invention.

Figure 5:
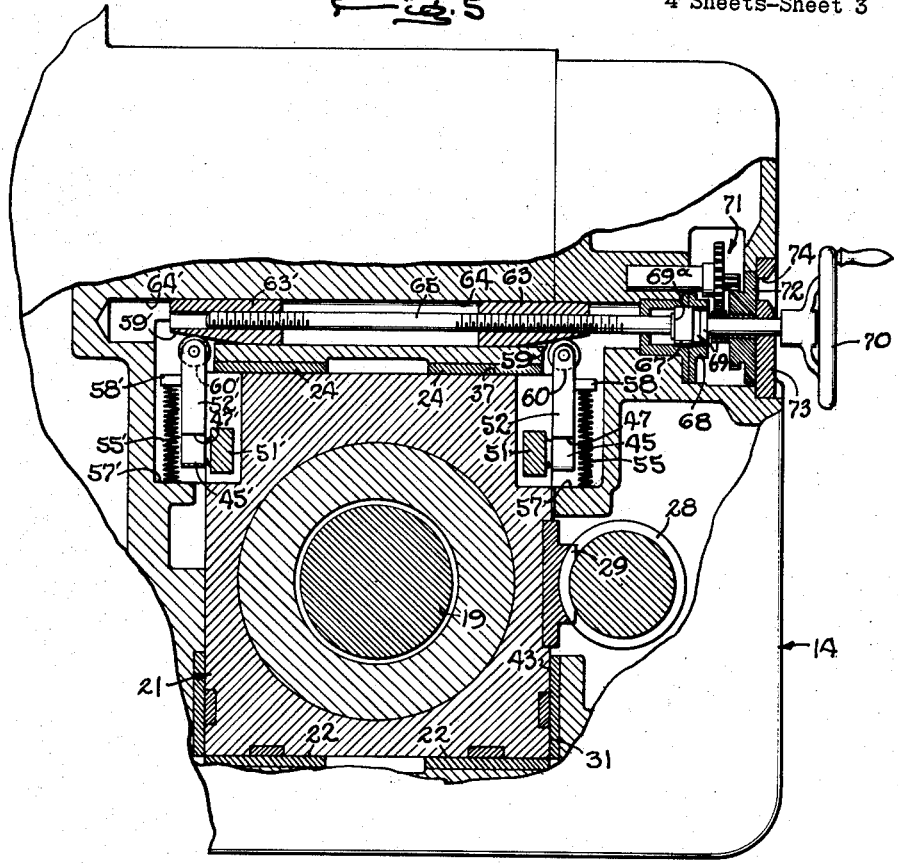
FIG. 5 is an enlarged fragmentary sectional view taken along the line 5—5 in FIG. 1.

The amount of tensioning of the brace for a given amount of sliding is determined, of course, by the angle of inclination of the plane 47, and the tension is increased in proportion to the amount of outward sliding of the ram. In this instance, means is provided for selectively adjusting this inclination to insure proper tensioning of the brace under any circumstances. As shown in FIGS. 4 and 5, the outer end of the lever 52 is urged upwardly, that is, in a clockwise direction around the pin 53, by a coiled compression spring 55 acting between an internal surface 57 (FIG. 5) of the head and a lug 58 outstanding from one side of the lever 52. To block upward movement of the lever, a stop 59 is disposed above the lever, the stop abutting in this instance against a roller 60 journaled in the lever to turn about an axis paralleling the longitudinal axis of the lever (see FIG. 4). Accordingly, the vertical position of the stop determines the slope of the plane, and the stop and its positioning elements comprise the means for adjusting such slope. A shoulder bolt 61 (FIGS. 3 and 11) is threaded into the head through an elongated vertical slot 62 in the free end of the lever so that the shank of the bolt abuts against opposite ends of the slot to provide upper and lower limits on the available adjustments of the free end of the lever.

Herein, the stop 59 comprises the lower surface of a block 63 slidable back and forth across the top of the ram in a guideway 64 formed in the head and extending over the roller 60. The lower surface is inclined upwardly and outwardly over the roller 60 so that the latter comprises a follower moved up and down by the inclined cam surface 59 as the block is moved back and forth along the guideway 64.

To facilitate shifting of the block back and forth along the guideway, the block is threaded onto a shaft 65 journaled at one end on the head with the other end portion extending inwardly through the block and along the guideway. In this instance, the shaft 65 is journaled in a bearing 67 seated in an internal annular groovoe in a housing 68 mounted in the head, and nuts 69 and a shoulder 69a on the shaft on opposite sides of the bearing 67 prevent axial shifting of the shaft. Consequently, as the shaft is turned in one direction or the other, the block 63 slides along the guideway to adjust the angular position of the lever 52 in the appropriate direction.

A hand wheel 70 (FIGS. 1 and 5) is fast on the projeting outer end of the shaft 65 to facilitate turning the latter, and mechanism is provided to indicate the selected position of the lever. Herein, the turning of the shaft is transmitted through suitable gearing 71 to a dial 72 journaled on the shaft and covered by a plate 73 having a sight opening 74 through which the dial may be read. The dial preferably is calibrated for different weights of loads to be applied at the outer end of the ram. When a heavier cutting tool such as an angular attachment (not shown) is to be used, the wheel is turned in the appropriate direction until the dial shows the new weight to be supported. In such a case, of course, the slope of the plane 47 would be increased to produce a greater tensioning in the brace 30.

As shown in the drawings, a second brace 30' identical to the brace 30 is disposed on the opposite side of the ram and identical associated parts are provided for supporting and tensioning this brace, corresponding parts being identified in the drawings by corresponding primed reference numbers. With this arrangement, the lifting force applied to the outer end of the ram is doubled and the force is balanced to avoid a tendency to twist the ram. Adjustment of the inclines 47 and 47' of the levers 52 and 52' may be correlated and made simultaneously merely by reversing the cam surfaces on the blocks 63 and 63' and using reverse threads at opposite ends of the shaft 65 and in the blocks. Thus, turning of the shaft in one direction movoes the blocks apart and the rollers 60 and 60' downwardly while turning of the screw in the opposite direction moves the blocks together to permit the springs 55 and 55' to raise the free ends of the levers.

While the ends of the rods 30 and 30' may be secured to the anchor blocks, the rocker arms, and the crank legs in various ways, preferably threaded connections are used to insure tight and rigid gripping of the rod ends. Further, the threads on opposite ends of each rod may be reversed to facilitate adjustment of the length of the rods. By turning a rod in one direction or the other, the distance between the connections at the ends may be increased or decreased. As shown in FIG. 3, the groove 42 is enlarged at 75 (FIG. 8) to permit gripping of the rod with a suitable tool so that adjustments of the rod may be made when the ram is assembled.

With this type of connection, however, there is a slight but significant change in the angular relation between the end portions of the rod axes as the rocker is turned to tension the brace, and bending of the rods occurs at the opposed faces of the rocker and at the anchor and bell crank. In view of the substantial forces carried by the rods in service use, it is desirable initially to misaline the opposite ends of each rod in the retracted position of the ram so that the rods will be straight in the extended position of the ram when the full load is applied.

Figure 6:
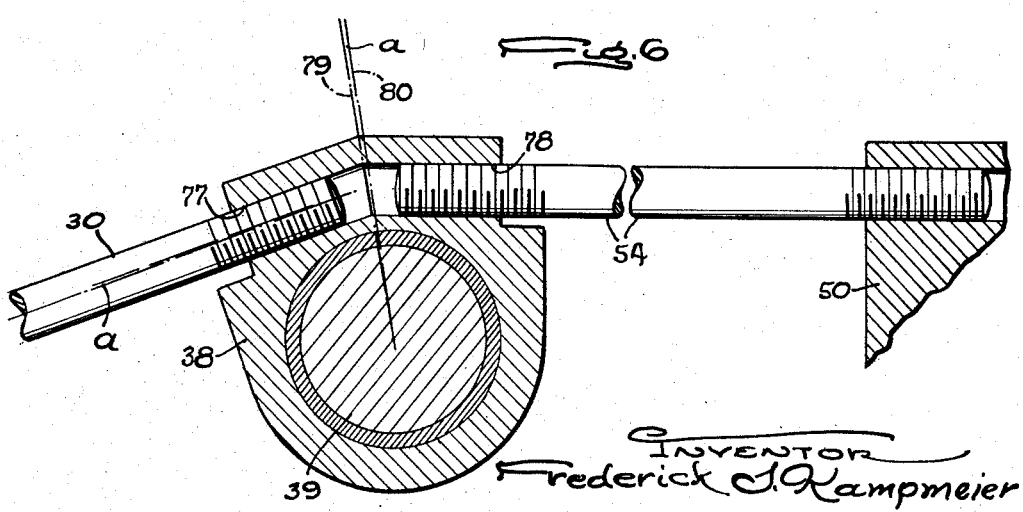
FIG. 6 is an enlarged fragmentary view of a portion of FIG. 3 with the parts shown in slightly different positions.

For this purpose, the axes of the openings 77 and 78 (FIG. 6) in the rocker arm 38 for receiving the threaded adjacent ends of the rods are disposed at a predetermined angle corresponding to the angle between the rods when the ram is extended. Then, in assembling the rods onto the ram, the rocker initially is centered on a line 79 which is offset in a counterclockwise direction, that is, toward the anchor, a small angle $a$ from a line 80 which represents the centerline of the rocker when the rod ends are properly alined. The angle $a$ is determined in advance according to the amount of rocker arm movement to be required in a particular application of the braces. As shown in FIG. 6, this offset in the position of the rocker correspondingly misalines the end portions of the axes of the rods. Thus, when the ram is extended and the full load is applied to the braces, the rocker is swung to the centered position and the full load is applied with the rod ends axially alined.

I claim as my invention:

1. The combination of, a support, an elongated member mounted on said support for endwise sliding relative thereto along a generally horizontal path and between an extended position and a retracted position, one end portion of said member projecting outwardly from said support when said member is in said extended position, a brace connected at one end to one side of said member adjacent the lower edge and outer end thereof, means for movably supporting the upper end of said brace adjacent the upper edge of said one side and spaced inwardly from said outer end whereby the brace is inclined upwardly and inwardly from said outer end, a cam fixed relative to said support, a follower carried by said member and riding along said cam to move transversely of said path as said member slides outwardly, and a connection for converting the transverse movement of said follower into inward movement of said supporting means thereby to increase the tension on said brace.

2. A combination as defined in claim 1 in which said supporting means comprises a generally upright rocker arm fulcrumed adjacent one of its end on said one side to swing about a horizontal axis extending transversely of said member and fastened at its free end to said upper end of said brace.

3. A combination as defined in claim 1 in which said cam comprises a plane surface inclined relative to said path to shift said follower in a vertical direction as said follower moves outwardly.

4. A combination as defined in claim 3 in which said connection includes a bell crank fulcrumed on said one side and having one generally horizontal leg and one generally vertical leg connected to said brace, said follower moving said horizontal leg in said vertical direction as said member moves outwardly thereby to move said vertical leg in a direction to increase the tension on said brace.

5. The combination of, a support, an elongated member mounted on said support for endwise sliding relative thereto along a generally horizontal path and between an extended position and a retracted position, one end portion of said member projecting outwardly from said support when said member is in said extended position, a brace connected at one end to one side of said member adjacent the lower edge and outer end thereof, means for movably supporting the upper end of said brace adjacent the upper edge of said one side and spaced inwardly from said outer end whereby the brace is inclined upwardly and inwardly from said outer end, a cam surface fixed relative to said support and inclined relative to said path, a follower carried by said member and riding along said cam surface to move transversely of said path as said member slides outwardly, a connection for converting the transverse movement of said follower into inward movement of said supporting means to increase the tension on said brace, and means for adjusting the slope of said surface thereby to increase and decrease the tensioning of said brace for a given amount of outward sliding of said member.

6. A combination as defined in claim 5 in which said cam surface is formed along one side of a lever pivoted adjacent one end on said support to swing about a horizontal axis extending transversely of said path.

7. A combination as defined in claim 6 in which said adjusting means includes a stop adjustably positioned on one side of the free end of said lever to abut against the latter, and a spring yieldably urging said free end against said stop.

8. The combination of, a support, an elongated member mounted on said support for endwise sliding relative thereto along a generally horizontal path and between an extended position and a retracted position, one end portion of said member projecting outwardly from said support in said extended position, a brace connected at one end to said one end portion at a point adjacent the lower edge thereof and spaced outwardly from said support in said extended position, means movably supporting the other end of said brace adjacent the upper edge of said member and intermediate the ends of the latter whereby said brace is inclined upwardly and toward said support, and cam and follower means responsive to movement of said member toward said extended position and operable to increase the tension on said brace in proportion to the amount of such movement thereby to urge said projecting end portion upwardly.

9. The combination of, a support, an elongated member mounted on said support for endwise sliding relative thereto along a generally horizontal path and between an extended position and a retracted position, one end portion of said member projecting outwardly from said support when said member is in said extended position, a brace connected to said one end portion at a point spaced outwardly from said support in said extended position, said brace extending upwardly from said point and toward said support, and cam and follower elements responsive to movement to said member toward said extended position and operable to increase the tension on the brace in proportion to the amount of such movement.

10. The combination of, a support, an elongated member mounted on said support for endwise sliding relative thereto along a generally horizontal path and between an extended position and a retracted position, one end portion of said member projecting outwardly from said support when said member is in said extended position, a brace connected to said one end portion at a point spaced outwardly from said support in said extended position, said brace extending upwardly from said point and toward said support, and means for tensioning said brace as said member slides toward said extended position thereby to urge said one end portion upwardly.

No references cited.